(12) United States Patent
Ross et al.

(10) Patent No.: US 12,141,345 B2
(45) Date of Patent: Nov. 12, 2024

(54) ADAPTING ASSISTANT SUGGESTIONS RENDERED AT COMPUTERIZED GLASSES ACCORDING TO CHANGES IN USER GAZE AND/OR OTHER USER INPUT

(71) Applicant: GOOGLE LLC, Mountain View, CA (US)

(72) Inventors: Chris Ross, Brooklyn, NY (US); Jarlan Perez, Norwalk, CT (US); Alexander Chu, Berkeley, CA (US); Naheel Jawaid, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 59 days.

(21) Appl. No.: 17/968,396

(22) Filed: Oct. 18, 2022

(65) Prior Publication Data
US 2023/0367392 A1    Nov. 16, 2023

Related U.S. Application Data

(60) Provisional application No. 63/340,645, filed on May 11, 2022.

(51) Int. Cl.
*G06F 3/01*    (2006.01)
*G06F 3/0482*    (2013.01)
(Continued)

(52) U.S. Cl.
CPC ............ *G06F 3/013* (2013.01); *G06F 3/0482* (2013.01); *G06F 3/14* (2013.01); *G06F 3/167* (2013.01); *G06F 9/453* (2018.02)

(58) Field of Classification Search
CPC ........ G06F 3/013; G06F 3/0482; G06F 3/167; G06F 16/9537; G06F 16/909;
(Continued)

(56) References Cited

U.S. PATENT DOCUMENTS

2013/0050258 A1    2/2013 Liu
2015/0193005 A1    7/2015 Di Censo et al.
(Continued)

OTHER PUBLICATIONS

Ben Dickson, "Why AR headsets are the true home for AI assistants" TechTalks. Retreived from https://bdtechtalks.com/2018/08/13/augmented-reality-artificial-intelligence-assistants. 7 pages, dated Aug. 13, 2018.
Mayank Sharma, "Digital Assistants in the Metaverse Might Be Better Conversationalists" Lifewire Tech for Humans. Retrieved from https://www.lifewire.com/digital-assistants-in-the-metaverse-might-be-better-conversationalists-5220894. 8 pages, dated Mar. 2, 2022.
(Continued)

*Primary Examiner* — Priyank J Shah
(74) *Attorney, Agent, or Firm* — Gray Ice Higdon

(57) ABSTRACT

Implementations set forth herein relate to an automated assistant that can render selectable suggestion(s) at a display interface of computerized glasses, and can adapt the suggestions according to changes to a gaze direction of the user and/or other further inputs from the user. The selectable suggestion(s) can be initially rendered based on contextual data that may be associated with a user who is directing their gaze into an environment that includes different environmental features. Certain environmental features can be identified by the automated assistant as being predicted to be of interest to the user and—when a user expresses interest in a particular feature—the selectable suggestions can be adapted. Interest of the user in the particular environmental feature can be expressed by redirecting their gaze towards the particular feature and/or providing further input relevant to the particular feature.

18 Claims, 8 Drawing Sheets

(51) Int. Cl.
*G06F 3/14* (2006.01)
*G06F 3/16* (2006.01)
*G06F 9/451* (2018.01)

(58) Field of Classification Search
CPC ............... G06T 19/006; G02B 27/017; G02B 2027/0178; H04N 13/383; H04N 13/332; H04N 13/344
See application file for complete search history.

(56) References Cited

U.S. PATENT DOCUMENTS

2017/0235361 A1    8/2017  Rigazio
2022/0188361 A1*  6/2022  Botros .................. G02B 27/01

OTHER PUBLICATIONS

Shirin Ghaffary, "Mark Zuckerberg wants to build a voice assistant that blows Alexa and Siri away" https://www.vox.com/recode/22948097/mark-zuckerberg-voice-assistant-metaverse-ai-announcement. 7 pages, dated Feb. 23, 2022.

European Patent Office; Invitation to Pay Additional Fees issued in Application No. PCT/US2022/052026; 12 pages; dated Mar. 24, 2023.

European Patent Office; International Search Report and Written Opinion issued in Application No. PCT/US2022/052026; 19 pages; dated May 15, 2023.

* cited by examiner

ADAPTING ASSISTANT SUGGESTIONS RENDERED AT COMPUTERIZED GLASSES ACCORDING TO CHANGES IN USER GAZE AND/OR OTHER USER INPUT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

As automated assistants become more prevalent in the lives of everyday users, the functionality of the automated assistants is growing to encompass an expanding range of capabilities. While this growth is typically desirable for end-users, such users may not have the means to readily discover how certain new features of an automated assistant can benefit them. As a result, certain tasks undertaken by a user may be handled more efficiently by the automated assistant—but for the user not being aware of assistant functionality that can assist with the tasks.

For example, a user who is exploring a foreign city may seek to engage with third party entities, such as a public transit authority and/or a food delivery service, but may not realize that such third party entities can be engaged through their automated assistant. Therefore, a user who may be proficient with interacting with their automated assistant in certain contexts (e.g., within their home) may not have any insight regarding how to most efficiently interact with their automated assistant in unfamiliar contexts. In some instances, this can result in wasting of time and resources when a user manually interacts with their respective personal computing device (e.g., interacting with a touch keyboard) without invoking their automated assistant to automatically handle certain tasks.

SUMMARY

Implementations set forth herein relate to an automated assistant that is accessible via wearable computerized glasses and that can render selectable suggestions at an interface of the computerized glasses based on features of an environment of the user. For example, the user can be on a sidewalk, exploring a foreign city, while wearing the computerized glasses. When the user gazes across a street, adjacent to the sidewalk, a variety of different locations and objects can appear in a visual scope of the computerized glasses. While gazing at the various locations and objects, the user can provide at least a partial input to the automated assistant, and, in response, receive suggestions that are based on the objects and locations that are within a current visual scope of the computerized glasses. Although there could be a very large number (e.g., hundreds) of objects and locations that are apparent within the current visual scope of the computerized glasses, the automated assistant can limit a number of suggestions to those that may be particularly relevant. Limiting the number of suggestions can conserve the often constrained computational resources of the computerized glasses (e.g., constrained battery capacity) and/or can account for the limited display interface of the computerized glasses (e.g., effective area for displaying suggestion(s) limited to prevent over-obstruction of a view of a user). As one example, the automated assistant can process contextual data for determining the suggestions to be presented to the user via an interface of the computerized glasses. The contextual data can indicate location, time, gaze, and/or other information associated with a moment when a user solicits the automated assistant for suggestions while: wearing the computerized glasses and gazing in a particular direction. In this way, time and energy can be preserved by providing more relevant suggestions to a user, who may be soliciting their automated assistant, rather than having the user manually scroll through a greater number of suggestions in response to an input to the automated assistant. Additionally, this can improve experiences with the computerized glasses, which may limit suggestions in certain contexts in order to promote safety of the user, and to preserve resources of the computerized glasses.

In some implementations, suggestion(s) can be rendered for the user at a display interface of the computerized glasses, and each suggestion can be selectable via input to the computerized glasses (e.g., spoken utterance, input gesture, etc.). For example, N suggestions can be determined for rendering, where N is greater than one, and only one of the suggestions can be rendered at a time via the computerized glasses (e.g., with verbal and/or touch input(s) enabling cycling through the suggestion that is rendered at a given time). When a suggestion is generated for an object that is outside of a current visual scope of the computerized glasses, a directional graphical user interface (GUI) element can be rendered at the display interface of the computerized glasses. The directional GUI element can be optionally selectable, and can provide an indication that a suggestion is available for an object that is outside of the current visual scope of the computerized glasses. In some implementations, the directional GUI element can be rendered simultaneously with one or more other selectable suggestions corresponding to objects inside and/or outside the current visual scope of the computerized glasses. The directional GUI element(s) can be smaller and less obtrusive than any suggestion that is being rendered, thereby enabling informing a user of additional suggestion(s) being available and of their direction relative to the user—while preventing simultaneous display of multiple suggestions in view of e.g., the limited display interface of the computerized glasses.

In some implementations, a set of selectable suggestions that are generated for rendering and/or rendered at the computerized glasses can be modified according to changes to a context of the user, changes to a visual scope of the computerized glasses, and/or additional input from one or more users. For example, while the user is wearing the computerized glasses and walking around the foreign city, the user can provide an invocation input (e.g., speaking "Assistant . . . ", tapping the computerized glasses, etc.) and/or other partial input directed to the automated assistant. In response, suggestion data that is generated using currently available contextual data can be utilized to render a first set of one or more selectable suggestions for the user. Thereafter, when either a change in context, a subsequent input, a direction of gaze and/or focus, and/or a modification to the visual scope of the computerized glasses is detected, a second set of one or more other selectable suggestions can be rendered in response.

For example, a user that is directing their gaze across a street towards a strip of restaurants may solicit, via their computerized glasses, an automated assistant to provide assistance in the current context. The user can solicit the automated assistant by providing an invocation input and/or by otherwise gazing in a particular direction in a manner that indicates the user would like to receive suggestions regarding what they are looking at. In response, the automated assistant can render a first set of selectable suggestions that can be rendered at a display interface of the computerized glasses. The selectable suggestions can be selected and/or generated based on a context of the user and/or one or more objects that are present in a visual scope of the computerized glasses. For example, the one or more objects can include 3 different restaurants, and the first of selectable suggestions can include a selectable GUI element for accessing a website for each respective restaurant. When the user redirects their gaze, and/or otherwise causes the visual scope of the computerized glasses to move towards a particular restaurant, the automated assistant can cause a second set of selectable suggestions to be rendered at the display interface. The second set of selectable suggestions can be selected and/or generated based on this updated context in which the user is more focused on the particular restaurant. Therefore, the second set of selectable suggestions can include one or more selectable GUI elements that provide additional information regarding the particular restaurant—instead of providing information for the 3 different restaurants.

In some implementations, the automated assistant can cause changes to a set of suggestions to occur at the computerized glasses and/or other assistant-enabled device in response to a user continuing to provide a spoken utterance. For example, when the user is gazing at the 3 different restaurants, the user may invoke the automated assistant by providing a partial spoken utterance such as "Assistant . . . ". In response, the automated assistant can proactively provide the first set of selectable suggestions at the display interface of the computerized glasses. As the user continues to provide another portion of the spoken utterance, such as "tell me about Syria Palace," the automated assistant can process audio corresponding to this additional spoken utterance in furtherance of updating the suggestions being rendered. For example, and in response to this additional spoken utterance, the automated assistant can cause a second set of selectable suggestions to be rendered. The second set of selectable suggestions can include a link to a digital menu for the particular restaurant (e.g., Syria Palace), a link to a webpage for "Syrian Food," and a link to a blog reviewing the particular restaurant.

In some implementations, a change to the selectable suggestions can occur in response to a change in context of the user. For example, the automated assistant can determine, with prior permission from the user, that the user has received a calendar invite with a specified location for an event. The calendar invite can be received while the user is directing the visual scope of the computerized glasses towards the 3 restaurants and, in response, the automated assistant can cause the second set of selectable suggestions to be rendered. In this example, the second set of selectable suggestions can include content that is based on the calendar invite, with prior permission from the user, as well as one or more objects that are in an environment with the user. For example, the user may be gazing at the 3 restaurants, but the calendar invite can reference a location that is located behind the user while the user is gazing at the 3 restaurants. Based on this context, the automated assistant can cause a directional GUI element to be rendered at an edge of the display interface, indicating that a certain basis for subject matter of the second set of selectable suggestions is located behind the user or otherwise outside of the visual scope of the computerized glasses.

Alternatively, or additionally, the second set of selectable suggestions can be rendered with the directional GUI element, thereby correlating the second set of selectable suggestions to the location behind the user. Alternatively, or additionally, there may be multiple directional GUI elements indicating a location of certain objects that may be of interest to the user in the current context. A particular directional GUI element that is pointing behind the user can have one or more features that distinguish the particular directional GUI element from the other directional GUI elements. In some implementations, when the user re-directs their gaze toward a separate directional GUI element and/or a separate object (e.g., a no parking sign) corresponding to the separate directional GUI element, a third set of selectable suggestions (e.g., a link to a local government website) can be rendered for supplementing any user interest expressed for the separate object.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
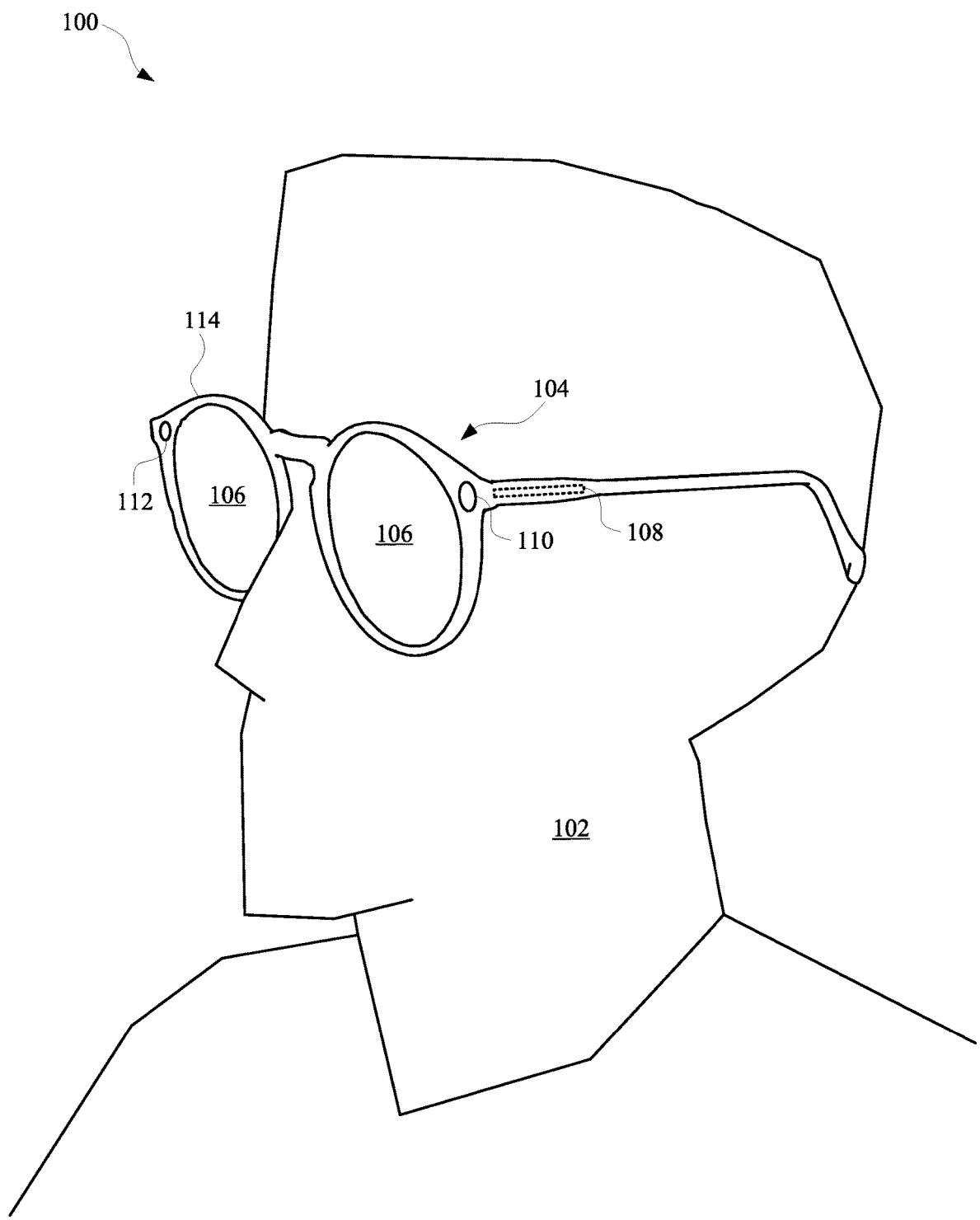
FIG. 1 illustrates a view of a user wearing computerized glasses according to some implementations discussed herein.

FIG. 1 illustrates a view 100 of a user 102 wearing computerized glasses 104 according to some implementations discussed herein. The computerized glasses 104 can include a computer 108, which can include one or more processors and/or one or more memory devices, and can receive power from one or more energy sources (e.g., battery, wireless power transfer, etc.). The computer 108 can be at least partially embodied by a housing 114 and/or can be separate from the housing 114. The housing 114 can resemble frames of one or more different styles of eyeglasses and can have one or more lenses 106 attached to the housing 114. In some implementations, the computerized glasses 104 can include one or more forward facing cameras 110, which can be arranged to have a visual scope that can include a field of view of the user 102. In some implementations, the computerized glasses 104 can include one or more inward facing cameras 112, which can be arranged to have another visual scope that includes one or more eyes of the user 102, with prior permission from the user 102. For example, one or more inward facing cameras 112 can be arranged to capture image data characterizing a position of a left eye and/or a right eye of the user 102. In some implementations, the computer 108 can be connected to one or more antennas and/or other communication hardware that allows the computer 108 to communicate with one or more other computing devices. For example, the computerized glasses 104 can connect to a Wi-Fi network, LTE network, and/or can communicate via Bluetooth protocol, and/or any other communications modality.

In some implementations, the one or more lenses 106 can operate as a display interface for rendering graphical content that is visible to a user who is wearing the computerized glasses 104. The graphical content that is rendered at the lenses 106 can assist the user 102 when they are in certain environments. For example, the user 102 can be directing their head and the computerized glasses 104 toward a direction that causes various environmental features (e.g., objects) to be in a visual scope of the forward-facing camera 110. When the user 102 is directing the computerized glasses 104 in this direction, the user 102 can provide a spoken utterance to, for example, cause the automated assistant to render one or more selectable suggestions related to the various environmental features. The automated assistant can detect the spoken utterance and, in response, cause multiple selectable suggestions to be rendered at the lenses 106. For example, a first selectable suggestion (e.g., a link to a city website) can be rendered in the lenses 106 to appear above a first environmental feature (e.g., a parking meter) and a second selectable suggestion (e.g., a link to a cab company website) can be rendered in the lenses 106 to appear above a second environmental feature (e.g., a cab parked near the parking meter).

In some implementations, each selectable suggestion can be "grayed out," blurry, blinking, and/or otherwise have one or more features that indicate that none of the selectable suggestions have yet to be selected by the user 102. In order to select one of the selectable suggestions, the user 102 can adjust their gaze and/or the direction of the computerized glasses 104 more towards the first selectable suggestion or the second selectable suggestion. In response, the automated assistant can detect the adjustment of the gaze and/or facing direction of the user 102 and cause the first selectable suggestion or the second selectable suggestion to provide feedback that one has been selected. For example, when the user 102 directs their gaze and/or the computerized glasses 104 more towards the first environmental feature, the first selectable suggestion can blink, shake, become idle, no long be grayed out, no longer be blurry, and/or otherwise indicate that the first selectable suggestion has been selected. In this way, the user 102 can receive feedback that they have selected a particular selectable GUI element and re-direct their gaze and/or the computerized glasses 104 if they prefer to select a different selectable GUI element. In some implementations, if the user 102 is satisfied with their selection, the user 102 can continue to look at the first selectable suggestion for a threshold period of time, or look away from both selectable suggestions, in order to confirm their selection and cause the first selectable suggestion to be activated.

FIG. 2A, FIG. 2B, FIG. 2C, and FIG. 2D illustrate a view 200, a view 220, a view 240, and a view 260 of a user 202 interacting with an automated assistant via computerized glasses 206 to cause the automated assistant to render various suggestions as the user 202 changes their gaze and/or provides further input(s). The user 202 can be located in an environment 212, such as a busy city street that includes various environmental features that the user 202 may be interested in receiving additional information about. Determining the particular environmental features that the user 202 may be interested in, over other features, can be performed based on contextual data, which can be processed during an operation 208 executing during, or prior to, the user 202 being in the environment 212. In some implementations, the contextual data can be generated by the computerized glasses 206 and/or another computing device(s) that communicates with the computerized glasses 206. For example, another portable computing device (e.g., a cellular phone 204) can communicate with the computerized glasses 206, with prior permission from the user 202, to provide location data, temporal data, assistant data, application data, and/or any other data that may be relevant to a current context of the user 202.

Figure 2A:
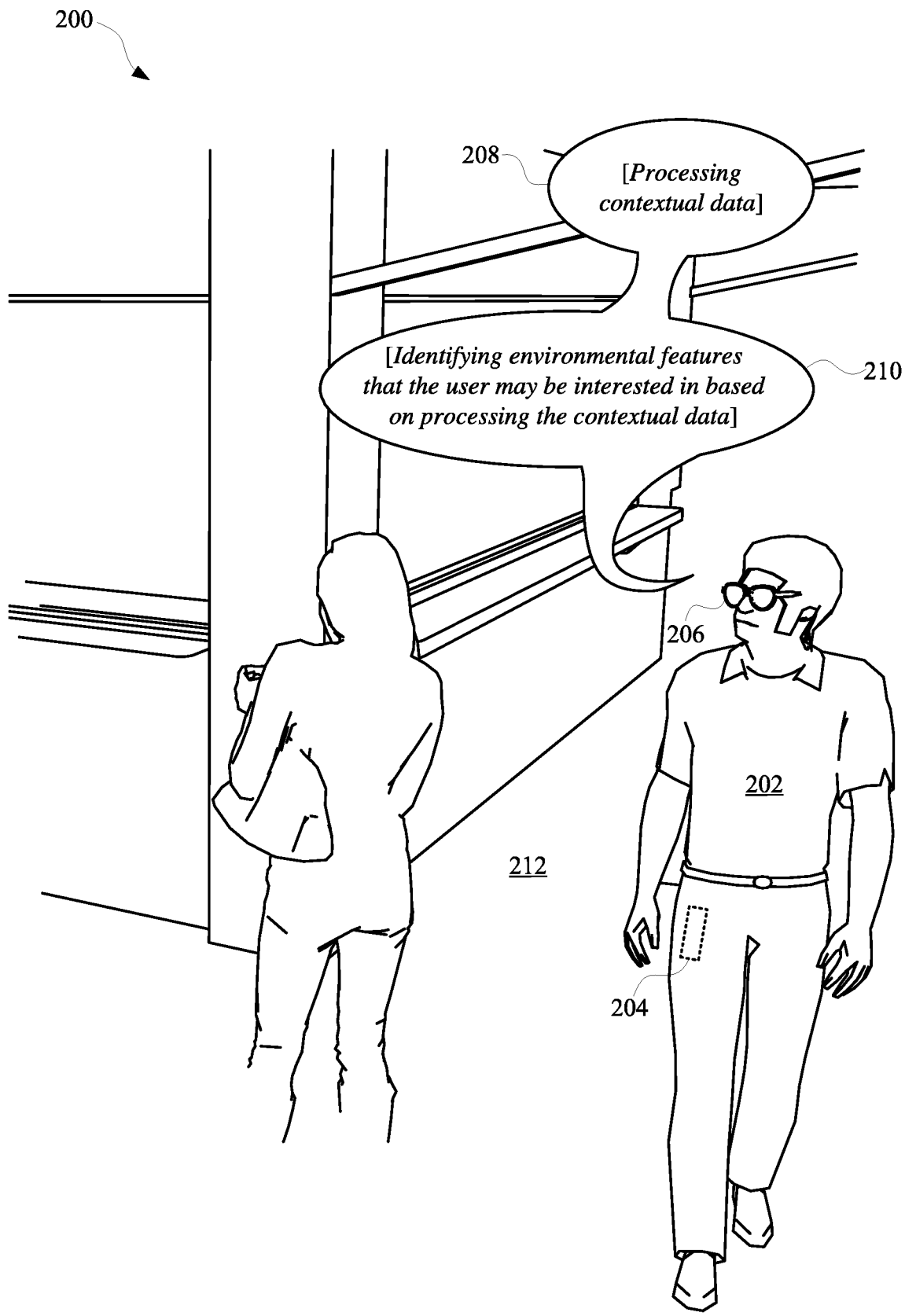
FIG. 2A, FIG. 2B, FIG. 2C, and FIG. 2D illustrate views of a user interacting with an automated assistant via computerized glasses to cause the automated assistant to render various suggestions as the user changes their gaze and/or provides further input(s).
Figure 2B:
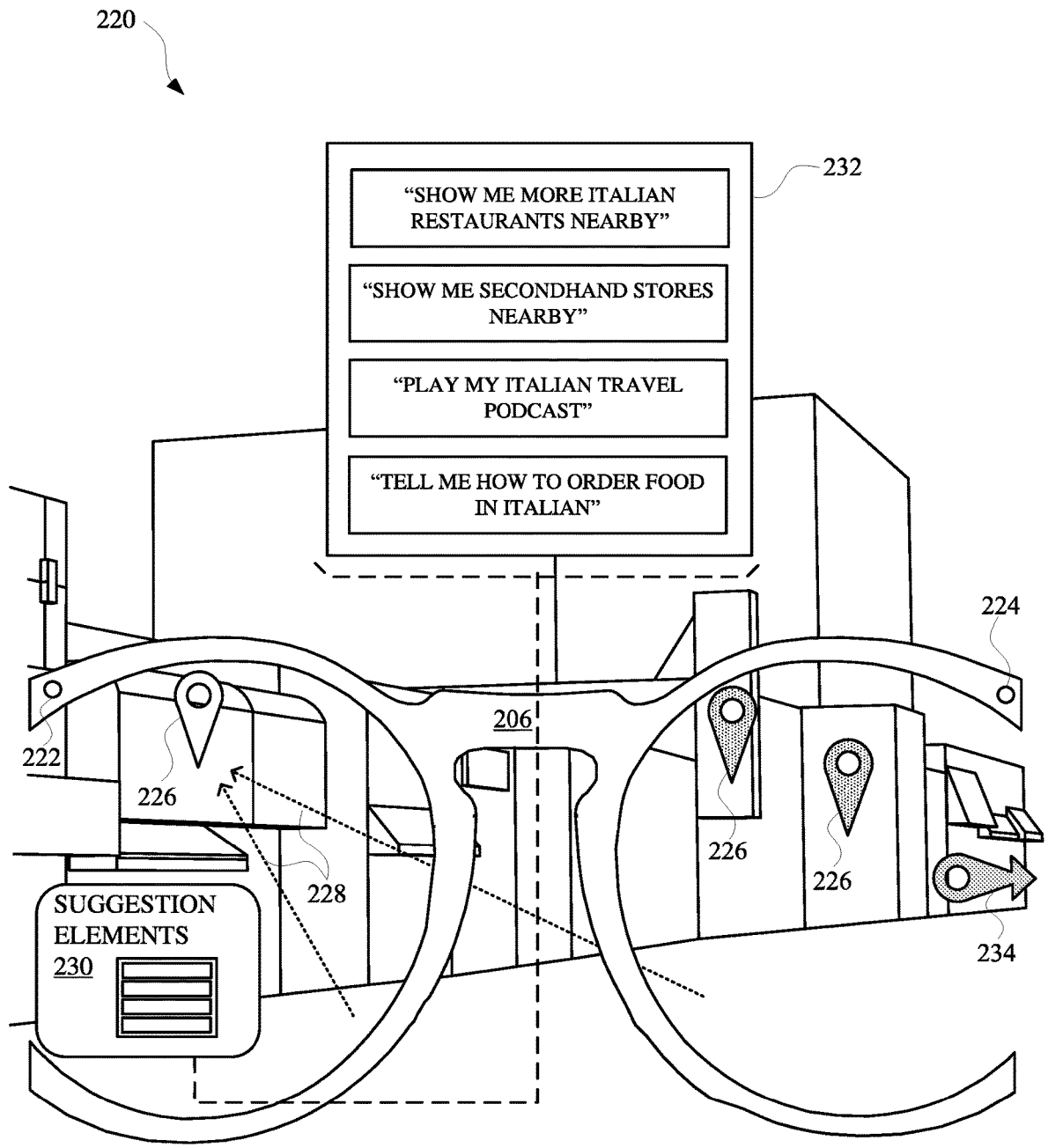

In some implementations, the contextual data can indicate that the user 202 was recently browsing for restaurants via their cellular phone 204, which can put the automated assistant on notice that the user 202 may be looking for a particular place to eat. Based on this determination, the automated assistant can cause any food-related environmental features, apparent in the visual scope of the computerized glasses 206, to be accentuated or otherwise identified by GUI elements 226 rendered at a display interface of the computerized glasses 206. For example, a forward-facing camera 222 of the computerized glasses 206 can capture an image of an environment that the user 202 is facing and, optionally, a rear-facing camera 224 can be used to determine a direction 228 of the gaze of the user 202. The image(s) can be processed as part of the contextual data to identify particular environmental features that the user 202 may be interested in. When the particular environmental features are identified, the automated assistant can cause the GUI elements 226 to indicate the environmental features that have been identified as of expected interest of the user 202. In some implementations, a particular GUI element 226 that the direction 228 of gaze is estimated to be most directed to can have a visual feature that is different from another visual feature shared by the other GUI elements 226. For example, and as illustrated in FIG. 2B, a fill color of the left-most GUI element 226 can be different from a fill color of the other GUI elements 226 because the direction 228 of gaze of the user 202 is directed more towards the left-most GUI element 226.

In some implementations, the contextual data can be processed to generate suggestion data, which can characterize a set of suggestions 232 that can be rendered at the display interface of the computerized glasses 206 as selectable suggestion elements 230. In some implementations, the set of suggestions 232 can be generated based on a direction 228 of the gaze of the user 202 and/or environmental features that are present in a visual scope of the computerized glasses 206. For example, contextual data such as location data and temporal data can indicate that multiple different Italian restaurants are open near the location of the user 202, and, additionally, the contextual data can also indicate that the user 202 has previously listened to an Italian restaurant podcast. Based on this information, and the user 202 gazing towards the Italian restaurant, the automated assistant can cause the GUI elements 226 to appear over and/or near a line of sight of restaurants, and also cause the set of suggestions 232 to appear with suggestions regarding Italian restaurants and/or an Italian podcast. In some implementations, the set of suggestions 232 can appear in both lenses of the computerized glasses 206 so that the user 202 may see the set of suggestions 232 as occupying a three-dimensional (3D) perspective view of the environment, optionally along with the GUI elements 226.

In some implementations, a particular location (e.g., a first location) that is a subject of the selectable suggestion elements 230 can be assigned a GUI element 226 that is different from GUI elements 226 assigned to other locations (e.g., a second location) that are within and/or not within a visual scope of the computerized glasses 206. In some implementations, a GUI element 234 corresponding to a location outside a visual scope of the computerized glasses 206 can be rendered to indicate a direction toward a shortest route to the location. This location can be identified based on the contextual data, gaze of the user 202, and/or other input from the user 202, thereby allowing the user 202 to be aware of a location of potential interest that may be outside a current field of view. As illustrated in FIG. 2B, the GUI element 234 can be rendered with a directional symbol pointing, for example, to the right of the user 202 and outside of a current visual scope of the computerized glasses 206.

Figure 2C:
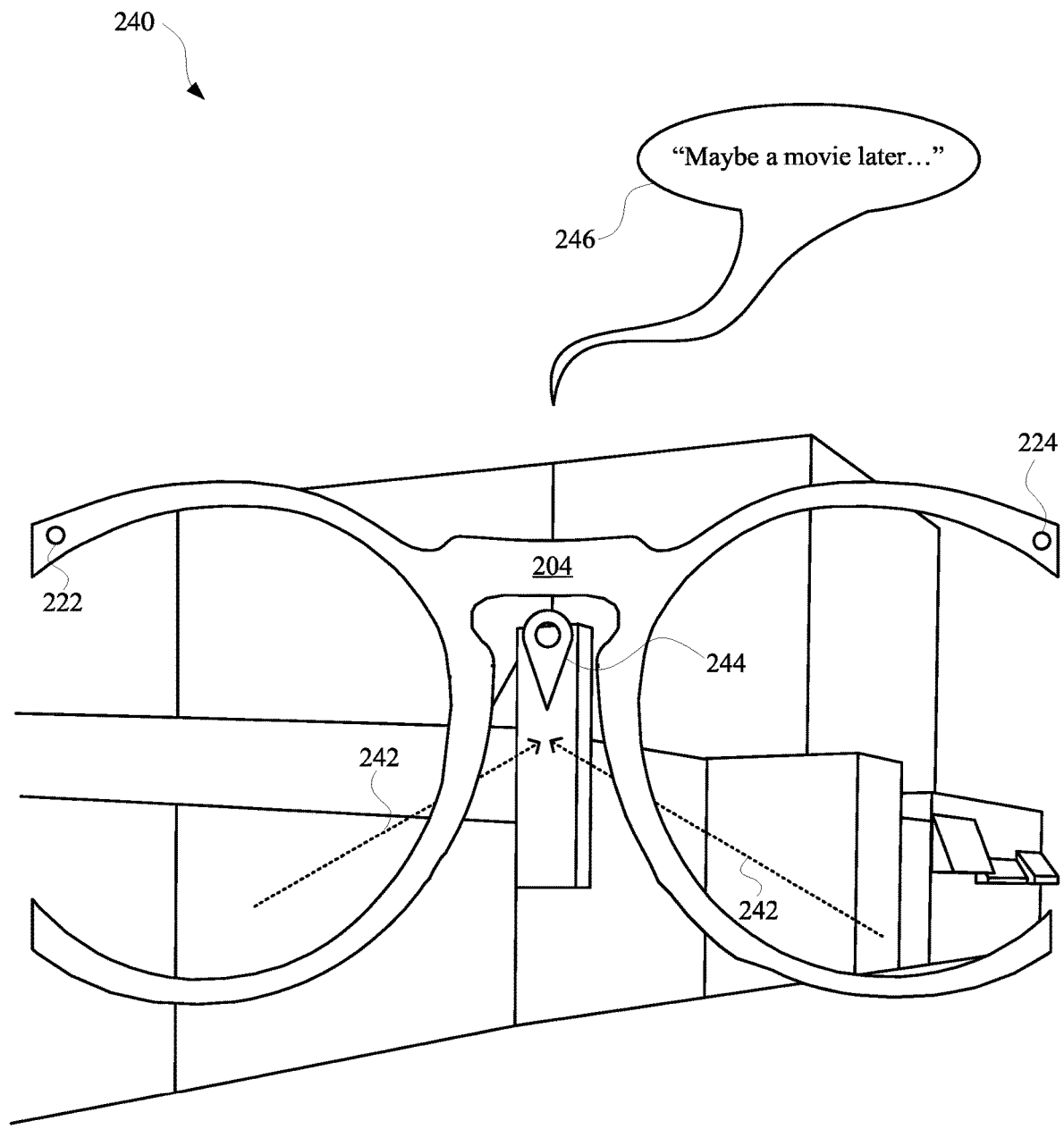
Figure 2D:
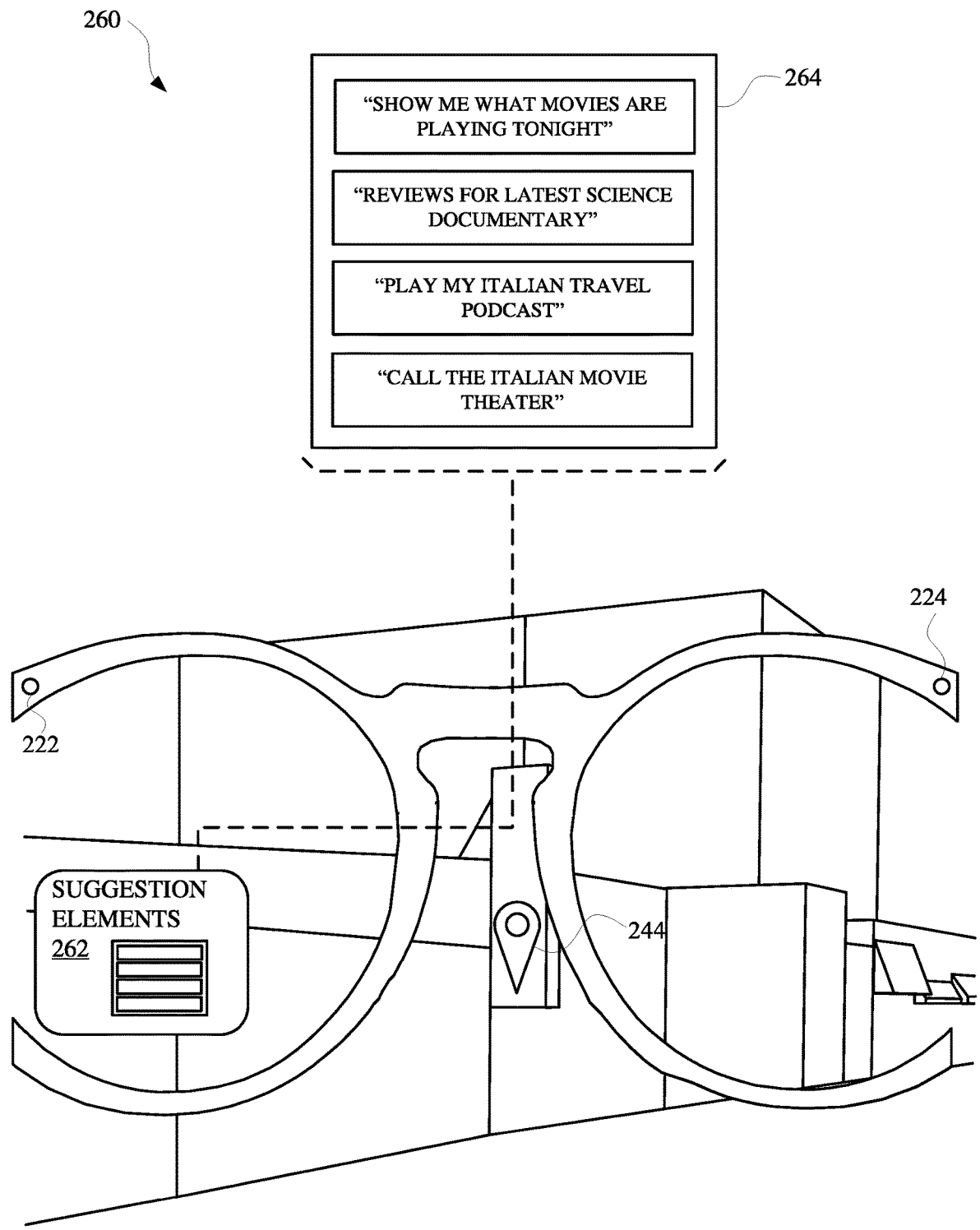

In some implementations, the set of suggestions 232 can be updated based on: updated contextual data being processed by the automated assistant, a subsequent input being received by the automated assistant, a change in the direction 228 of the gaze of the user 202, a change in the visual scope of the computerized glasses 206, and/or any other change that can be determined by the automated assistant with prior permission from the user 202. For example, the user 202 can provide a spoken utterance 246 that can be embodied in audio data that is processed by the automated assistant, with prior permission from the user 202. The spoken utterance 246 can be at least a partial utterance that may or may not include an invocation phrase (e.g., "Assistant . . .") and/or may not include an express command (e.g., "Find movies."). Rather, the spoken utterance 246, as illustrated in FIG. 2C, can be at least a partial utterance that can provide further context and assist the automated assistant with refining suggestions rendered at the display interface of the computerized glasses 206.

Alternatively, or additionally, the user 202 can change a direction 228 of their gaze towards a separate direction 242, and this separate direction can be used as a basis for refining the suggestions rendered by the automated assistant. For example, the user 202 can redirect their gaze from focusing on an Italian restaurant to focusing on a movie theater. In response, the automated assistant can cause the GUI elements 226 to no longer be rendered at the display interface of the computerized glasses 206. Furthermore, the automated assistant can cause an additional GUI element 244 to be rendered to appear at or near an environmental feature (e.g., the movie theater) that the user 202 may be directing their gaze towards and/or may have provided an input (e.g., the spoken utterance 246) that is relevant to the environment feature.

In some implementations, in response to the spoken utterance 246 and/or the user 202 redirecting their gaze, the automated assistant can cause a separate set of suggestions 264 to be generated and rendered at the display interface of the computerized glasses 206. For example, the separate set of suggestions can be generated based on the spoken utterance 246 and/or environmental features and/or lack of previous environmental features within the visual scope of the computerized glasses 206. For example, because the user 202 adjusted their gaze to be directed more towards the Italian movie theater (e.g., designated by the additional GUI element 244), the separate set of suggestions 264 can be rendered with movie theater-related suggestions. In some implementations, the separate set of suggestions can include selectable suggestions that can be selected via another spoken utterance (e.g., "Show me what movies are playing tonight") that may not include an invocation phrase for invoking the automated assistant. Alternatively, or additionally, the user 202 can select a particular selectable suggestion (e.g., "Call the Italian movie theater") by performing a gesture without directly contacting the computerized glasses 206 (e.g., by motioning their hand in front of the forward-facing camera 222 in a manner that indicates an interest in a particular selectable suggestion). It should be noted that, although the selectable suggestions 232 and the separate selectable suggestions 264 are illustrated away from the computerized glasses 206, these selectable suggestions are intended to appear within a field of view of the user 202 as a result of being rendered at the display interface of the computerized glasses 206.

Figure 3:
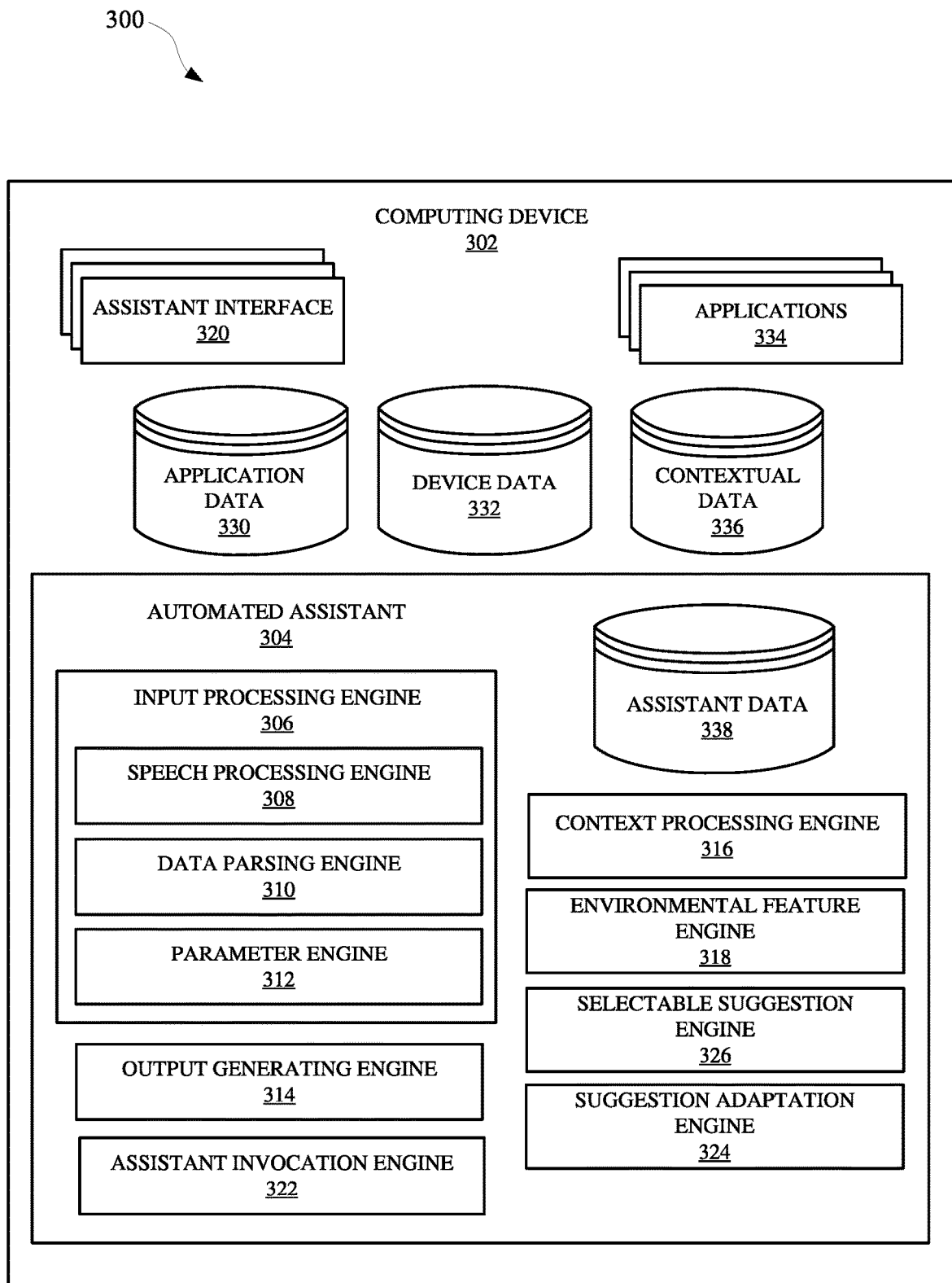
FIG. 3 illustrates a system that provides an automated assistant for rendering suggestions that can be rendered at a display interface of computerized glasses and can be dynamically adapted according to a change in gaze of the user and/or other input to the automated assistant.

FIG. 3 illustrates a system 300 that provides an automated assistant 304 for rendering suggestions that can be rendered at a display interface of computerized glasses and can be dynamically adapted according to a change in gaze of the user and/or other input to the automated assistant 304. The automated assistant 304 can operate as part of an assistant application that is provided at one or more computing devices, such as a computing device 302 and/or a server device. A user can interact with the automated assistant 304 via assistant interface(s) 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to initialize one or more actions (e.g., provide data, control a peripheral device, access an agent, generate an input and/or an output, etc.). Alternatively, the automated assistant 304 can be initialized based on processing of contextual data 336 using one or more trained machine learning models. The contextual data 336 can characterize one or more features of an environment in which the automated assistant 304 is accessible, and/or one or more features of a user that is predicted to be intending to interact with the automated assistant 304. The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third-party client devices can be in communication with a server device over a network, such as the Internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be exclusively processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 for providing an output to one or more applications 334.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 334 which can be provided by a third-party entity that is different from an entity that provided the computing device 302 and/or the automated assistant 304. An application state engine of the automated assistant 304 and/or the computing device 302 can access application data 330 to determine one or more actions capable of being performed by one or more applications 334, as well as a state of each application of the one or more applications 334 and/or a state of a respective device that is associated with the computing device 302. A device state engine of the automated assistant 304 and/or the computing device 302 can access device data 332 to determine one or more actions capable of being performed by the computing device 302 and/or one or more devices that are associated with the computing device 302. Furthermore, the application data 330 and/or any other data (e.g., device data 332) can be accessed by the automated assistant 304 to generate contextual data 336, which can characterize a context in which a particular application 334 and/or device is executing, and/or a context in which a particular user is accessing the computing device 302, accessing an application 334, and/or any other device or module.

While one or more applications 334 are executing at the computing device 302, the device data 332 can characterize a current operating state of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine in order to determine a suitable action to initialize via the automated assistant 304.

The computing device 302 can further include an assistant invocation engine 322 that can use one or more trained machine learning models to process application data 330, device data 332, contextual data 336, and/or any other data that is accessible to the computing device 302. The assistant invocation engine 322 can process this data in order to determine whether or not to wait for a user to explicitly speak an invocation phrase to invoke the automated assistant 304, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 322 can cause the automated assistant 304 to detect, or limit detecting, spoken invocation phrases from a user based on features of a context and/or an environment. Additionally, or alternatively, the assistant invocation engine 322 can cause the automated assistant 304 to detect, or limit detecting for one or more assistant commands from a user based on features of a context and/or an environment. In some implementations, the assistant invocation engine 322 can be disabled or limited based on the computing device 302 detecting an assistant suppressing output from another computing device.

In this way, when the computing device 302 is detecting an assistant suppressing output, the automated assistant 304 will not be invoked based on contextual data 336—which would otherwise cause the automated assistant 304 to be invoked if the assistant suppressing output was not being detected.

In some implementations, the system 300 can include a context processing engine 316 that can process contextual data 336, device data 332, application data 330, and/or assistant data 338 for determining features of an environment of a user. The context processing engine 316 can also process data in furtherance of determining an estimated degree of interest in each particular environmental feature in an environment of the user. When an estimated degree of interest for a particular environmental feature satisfies a threshold degree of interest, the particular environmental feature can be identified to an environmental feature engine 318. In some implementations, the degree of interest can be determined using one or more heuristic processes and/or one or more trained machine learning models. For example, data accessible to the context processing engine 316 can be processed using one or more trained machine learning models in furtherance of determining certain subject matter that the user may be interested in (with prior permission from the user) at any particular time, location, and/or in a certain context. As a result of this processing, certain subject matter can be identified and an estimated degree of interest of the user in certain environmental features can be determined based at least on that certain subject matter. When certain environmental features are determined to have an estimated degree of user interest that satisfies a threshold degree of interest (e.g., as determined by the automated assistant 304 based on a given context), these certain environmental features can be identified to the environmental feature engine 318.

The environmental feature engine 318 can process the data characterizing each identified environmental feature to determine a type of environmental feature that the user may be interested in while in a certain context. For example, while a user may be estimated to be interested in various different environmental features, the automated assistant 304 can generate comparative data for comparing traits of certain environmental features (e.g., determine that certain environmental features are restaurants, cars, street signs, etc.). These traits can be classified using one or more heuristic processes and/or one or more trained machine learning models to identify a type of feature of a group of environmental features. This identified type can then be utilized by a selectable suggestion engine 326 to render selectable suggestions that may correspond to a type of environmental feature (e.g., suggestions for only restaurants and/or restaurant menu items available near the user). For example, when the user is directing their gaze toward a street block that has multiple restaurants, the environmental feature engine 318 can determine that the user may be interested in a "restaurant" type of environmental feature. Based on this determination, and data from the context processing engine 316, the selectable suggestion engine 326 can generate selectable suggestions corresponding to a "restaurant" type of environmental feature. The selectable suggestions can, for example, provide links to information (e.g., webpages, application interfaces, etc.) about the multiple restaurants on the street block, such as menu items available at each particular restaurant. In some implementations, the selectable suggestions can be rendered as selectable GUI elements at a display interface of computerized glasses. When the user is directing their gaze at a particular environmental feature, one or more selectable suggestions and/or GUI element(s) corresponding to that particular environmental feature can be accentuated and/or otherwise made to appear differently from the other selectable suggestions and/or other GUI elements.

In some implementations, the system 300 can include a suggestion adaptation engine 324 that can cause the selectable suggestions that are rendered by the automated assistant 304 to be adapted according to any change in context, change in gaze, and/or change to other information that may be available to the automated assistant 304 with prior permission from the user. For example, data captured by an inward or rear-facing camera can be processed to determine whether the user has altered their gaze to be redirected toward another environmental feature. When the user is determined to have redirected their gaze, data associated with the other environmental feature can be processed to generate another set of selectable suggestions that can be rendered at the display interface of the computerized glasses. Alternatively, or additionally, selectable suggestions can be adapted when the user has not redirected their gaze but has otherwise provided a subsequent input to the automated assistant 304 and/or exhibited a change in context. In this way, the user would not have to manually select the suggestions that the user is not particularly interested in. Rather, the user can influence a fluidity of suggestions being rendered via the automated assistant 304 by providing relatively short inputs to the automated assistant 304 and/or expressing interest in various objects as they might normally (e.g., gazing and/or moving away from objects they are less interested in, and gazing and/or moving towards objects they are more interest in).

Figure 4:
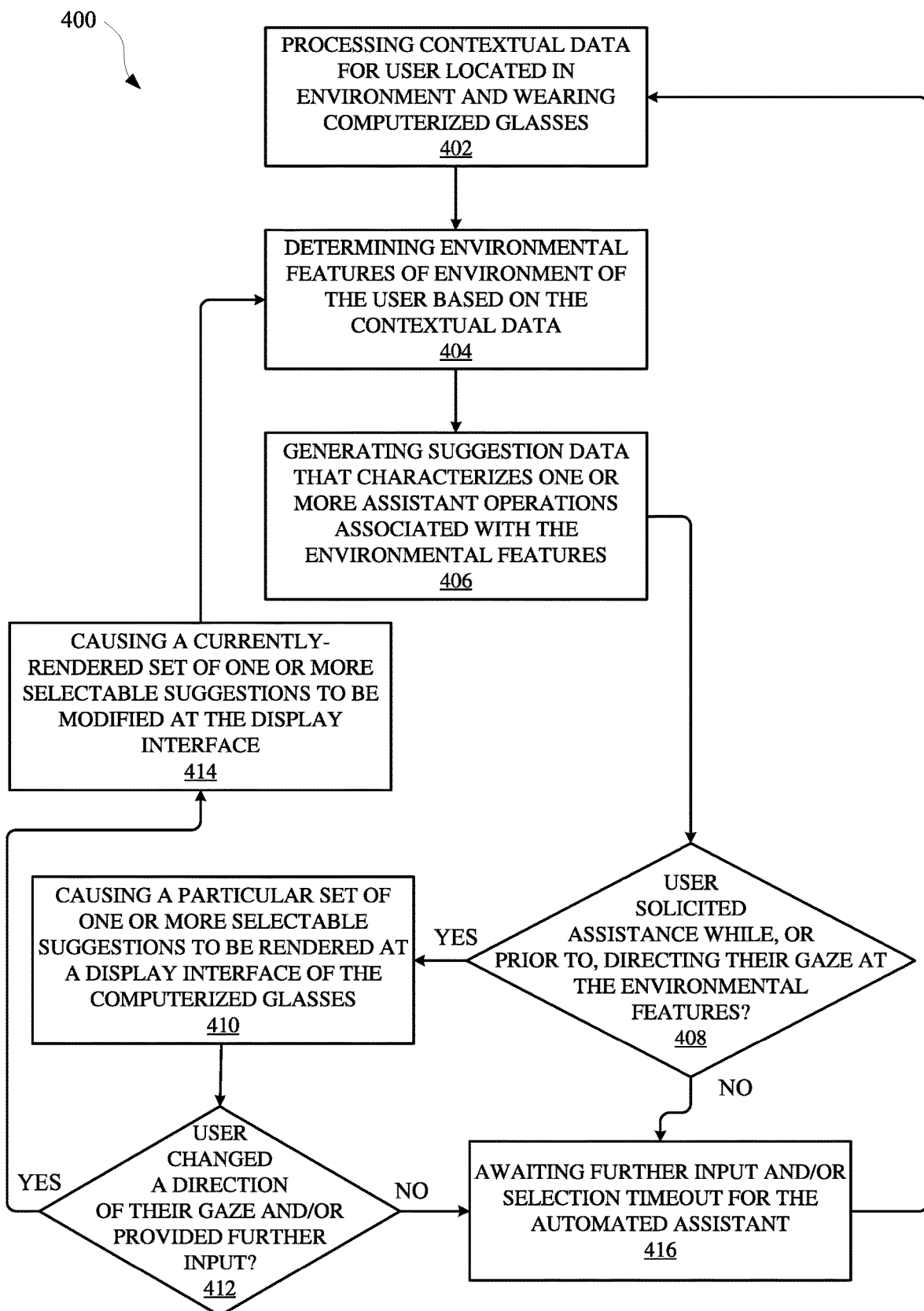
FIG. 4 illustrates a method for providing selectable suggestions at a display interface of computerized glasses according to features of an environment of a user who is wearing the computerized glasses and/or contextual data associated with the user.

FIG. 4 illustrates a method 400 for providing selectable suggestions at a display interface of computerized glasses according to features of an environment of a user who is wearing the computerized glasses and/or contextual data associated with the user. The method 400 can be performed by one or more computing devices, applications, and/or any other apparatus or module that can be associated with an automated assistant. The method 400 can include an operation 402 of processing contextual data associated with a user located in an environment and wearing computerized glasses. The contextual data can be based on a current context of the user, an anticipated context of the user, and/or a prior context of the user. For example, the contextual data can include data that is generated by one or more sensors that are integral to the computerized glasses and/or integral to another computing device that communicates with the computerized glasses. The contextual data can include images, audio, video, location data, temporal data, and/or any other information, with prior permission from the user, of an environment of the user, and can therefore capture various features of the environment. Alternatively, or additionally, the contextual data can include data that is based on one or more prior interactions between the user and the automated assistant, and/or one or more other users and their respective automated assistant(s) (with prior permission from the user(s)).

The method 400 can proceed from the operation 402 to an operation 404 of determining environmental features of the environment of the user based on processing the contextual data. In some implementations, one or more heuristic processes and/or machine learning models can be utilized to determine features of an environment of the user. For example, a sensor of the computerized glasses can be utilized to determine a direction of gaze of the user, another sensor can be utilized to determine a coordinate location of the user, and/or other data can be utilized to determine a current time in which the user is gazing into their environment. Based on this information, an automated assistant that is accessible via the computerized glasses can identify certain features of interest that are located in a visual scope of the computerized glasses. For example, the automated assistant can process the information utilizing one or more trained machine learning models to determine a natural language understanding of signs that may be within the visual scope of the computerized glasses. As an example, the signs can include multiple different kitchen devices that are being advertised for sale at stores that are across the street from the user (e.g., the user may be staring across the street towards the stores). The automated assistant can therefore identify each particular kitchen device (e.g., Food Processor, Kitchen Robot, Espresso Machine).

The method 400 can proceed from the operation 404 to an operation 406, which can include generating suggestion data that characterizes one or more assistant operations associated with the environmental features. In some implementations, the suggestion data can include links, and each link can correspond to a respective feature within the environment. When a particular link is selected, the automated assistant can cause information stored in association with the link to be rendered at the display interface of the computerized glasses. This information can include, for example, additional selectable suggestions that can be activated by the user and/or the automated assistant, content of one or more web pages that may be accessible via the computerized glasses, content generated by one or more applications associated with the automated assistant, content generated by one or more devices that communicate with the computerized glasses, and/or any other information that can be associated with the automated assistant. For example, when the user is gazing at a variety of kitchen device advertisements, the suggestion data can include links to websites for the variety of kitchen devices that are observed within the visual scope of the computerized glasses.

The method 400 can optionally proceed from the operation 406 to an operation 408, which can include determining whether the user solicited assistance from the automated assistant while, or prior to, directing their gaze at the environmental features. The user can solicit the automated assistant for assistance by providing a direct and/or indirect input to the automated assistant via the computerized glasses and/or another computing device. For example, the user can provide an invocation input (e.g., a tap gesture, a spoken input, etc.) to cause the automated assistant to be invoked and provide the user with any assistance that may be warranted in a current context. When the user is gazing across the street at the kitchen device advertisements, for example, the user can tap the computerized glasses with their finger as an invocation input. Alternatively, or additionally, the user gazing at a particular object or objects can be interpreted, by the automated assistant and with prior permission from the user, as an invocation input that the automated assistant can respond to. For example, when the user has gazed through lenses of the computerized glasses towards the kitchen device advertisements for a threshold duration of time, the automated assistant can be invoked and provide suggestions to the user.

When the user is determined to have solicited the automated assistant for assistance while, or prior to, directing their gaze at the environmental features, the method 400 can proceed from the operation 408 to an operation 410. Otherwise, the method 400 can proceed from the operation 408 to an operation 416 of awaiting further input and/or a selection timeout for the automated assistant. The operation 410 can include causing a particular set of one or more selectable suggestions to be rendered at a display interface of the computerized glasses. In some implementations, the set of one or more selectable suggestions can be rendered such that each selectable suggestion is rendered to appear near, and/or over top of, a respective object visible in the visual scope of the computerized glasses that is associated with the selectable suggestion. Alternatively, or additionally, the set of one or more selectable suggestions can be rendered in an organized array at a portion of the display interface of the computerized glasses. A user can select a particular selectable suggestion by providing an input gesture, a spoken utterance, and/or any other input that is directed to the particular selectable suggestion. However, in some implementations, the user can decide to provide further input and/or adjust their gaze, thereby causing the automated assistant to modify the set of selectable suggestions that are being rendered.

The method 400 can proceed from the operation 410 to an operation 412 of determining whether the user has changed a direction of their gaze and/or provided further input to the automated assistant. The user can change a direction of their gaze with or without moving their head, and with or without moving a position of their eyes. For example, one or more sensors of the computerized glasses can detect changes to a visual scope of the computerized glasses, without determining a gaze of the user, and deduce that the direction of gaze of the user has changed. Alternatively, or additionally, one or more sensors of the computerized glasses can determine that a position of an eye(s) of the user has changed, thereby indicating that the gaze of the user has changed. In some implementations, one or more additional environmental features to which the user is directing their gaze can be identified, and can be used as a basis for rendering a different set of one or more selectable suggestions. Alternatively, or additionally, the user can provide a subsequent input, such as a spoken utterance (e.g., a partial spoken utterance such as "show me where . . . "), and this subsequent input can be used as a basis for rendering a different set of one or more selectable suggestions.

When the user is determined to have changed their gaze and/or provided further input, the method 400 can proceed from the operation 412 to an operation 414 of causing a currently-rendered set of one or more selectable suggestions to be modified at the display interface. For example, in response to the user modifying a direction of their gaze and/or providing further input, the automated assistant can cause one or more selectable suggestions of the set of selectable suggestions to no longer be rendered at the display interface. In some implementations, a particular selectable suggestion that is removed from the display interface can be selected for removal based on one or more features of the environment no longer appearing in the visual scope of the computerized glasses. The method 400 can proceed from the optional operation 414 to the operation 404 of determining environmental features of the environment, which may be apparent in the modified visual scope of the computerized glasses and/or may be within a direction of a gaze of the user.

In this way, the user can expressly and/or non-expressly solicit selectable suggestions from their automated assistant while wearing computerized glasses, and those suggestions can be updated according to a shifting interest of the user. This can eliminate the need for the user to provide additional inputs to receive updated suggestions, thereby preserving computational resources and/or power resources of the computerized glasses. Furthermore, as the users interact with suggestions rendered via the computerized glasses, machine learning models can be further trained (with prior permission from the user) using training data generated during such interactions. Further training of certain machine learning models in this way can allow the automated assistant to provide more accurate suggestions, thereby also reducing a number of suggestions users may have to "scroll" through before identifying a suitable suggestion to select. This can further preserve computational resources and/or power resources at the computerized glasses. Such resources may be essential when a user is traveling away from home and may not have resources immediately available to charge their device and/or wait for certain processes to complete.

Figure 5:
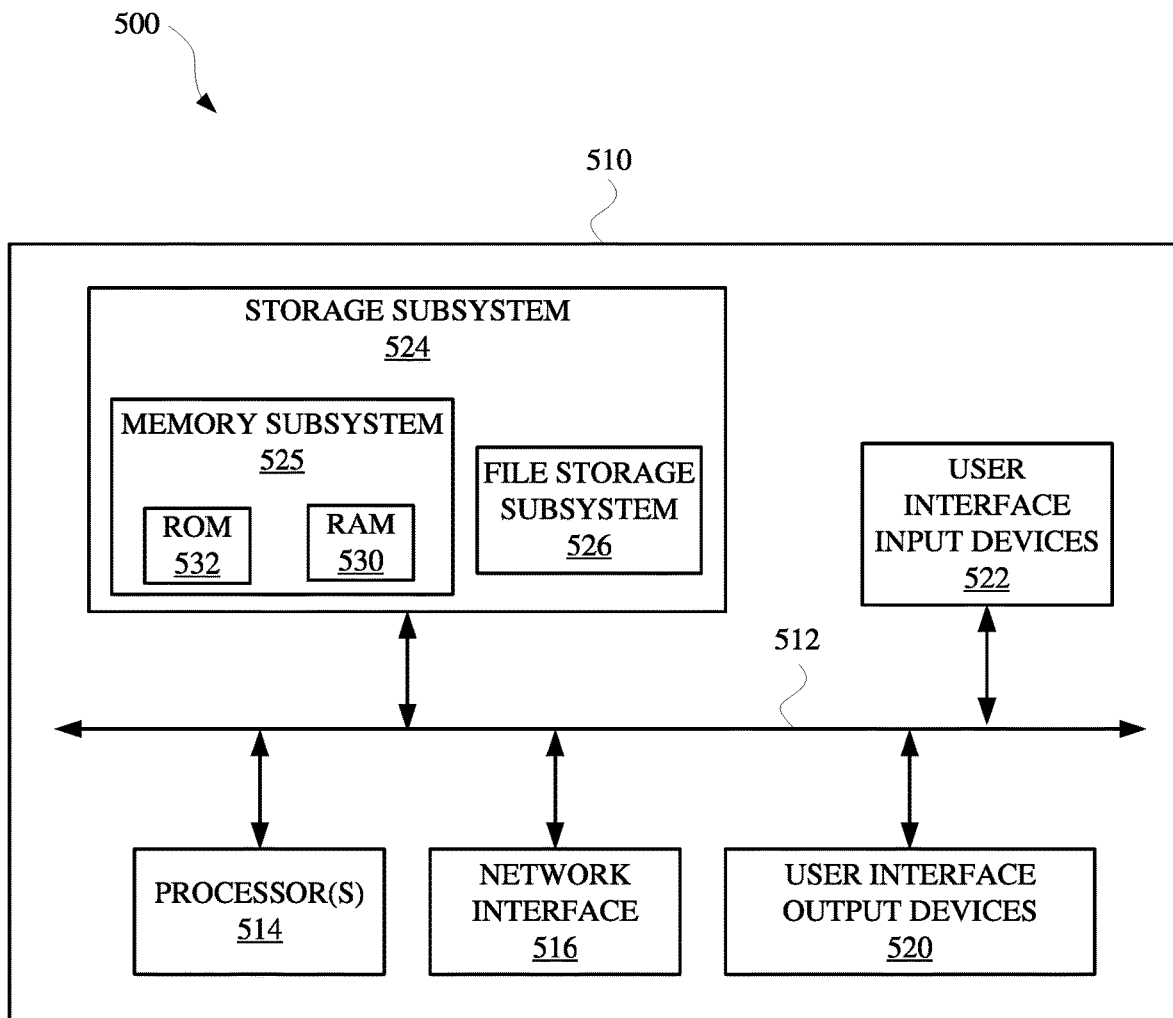
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, interface(s) of computerized glasses, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of system 300, automated assistant, computerized glasses, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as processing contextual data generated at computerized glasses that are being worn by a user who is located in an environment having features that are characterized by the contextual data. The computerized glasses provide access to an automated assistant that can be invoked by the user via an interface of the computerized glasses, and the contextual data is generated using one or more sensors that are integral to the computerized glasses and/or integral to a separate computing device that communicates with the computerized glasses. The method can further include generating, based on processing the contextual data, suggestion data that characterizes one or more operations that are associated with the environment of the user and that can be initialized by the automated assistant while the user is located in the environment. The method can further include determining that the user has provided an invocation input to the automated assistant while the user is wearing the computerized glasses and is located in the environment. The invocation input is received at the interface of the computerized glasses. The method can further include causing, based on the suggestion data and in response to the user providing the invocation input to the computerized glasses, a set of one or more selectable suggestions to be rendered at a display interface of the computerized glasses. A user selection of a particular selectable suggestion of the set of the one or more selectable suggestions causes the automated assistant to initialize performance of the one or more operations associated with the environment of the user.

These and other implementations disclosed herein can include one or more of the following features.

In some implementations, the method can further include determining, subsequent to the user providing the invocation input, that the user has provided an additional input to the automated assistant, where the additional input includes a spoken utterance that embodies a portion of a command phrase that is actionable by the automated assistant; and causing, based on the portion of the command phrase, a separate set of one or more selectable suggestions to be rendered at the display interface of the computerized glasses. In some implementations, the contextual data further characterizes a particular time that the user is wearing the computerized glasses in the environment, and the suggestion data is generated further based on the particular time. In some implementations, the method can further include determining, subsequent to the user providing the invocation input, that the user has adjusted a direction of gaze while wearing the computerized glasses, where the direction of gaze is determined using the one or more sensors that are integral to the computerized glasses; and causing, based on the user adjusting the direction of gaze, a separate set of one or more selectable suggestions to be rendered at the display interface of the computerized glasses.

In some implementations, the features include a first location and a second location, processing the contextual data includes determining that a prior interaction between the user and the automated assistant is associated with the first location, and the suggestion data is generated further based on the prior interaction between the user and the automated assistant. In some implementations, causing the set of one or more selectable suggestions to be rendered at the display interface of the computerized glasses includes: causing a particular selectable suggestion to be rendered with an indication that the particular selectable suggestion is associated with the first location. In some implementations, causing the particular selectable suggestion to be rendered with the indication that the particular selectable suggestion is associated with the first location includes: causing the particular selectable suggestion to be rendered at a location of the display interface that appears more proximate to the first location than the second location.

In some implementations, a method implemented by one or more processors is set forth as including operations such as processing contextual data generated at computerized glasses that are being worn by a user who is located in an environment having features that are characterized by the contextual data. The computerized glasses provide access to an automated assistant that can be invoked by the user via an interface of the computerized glasses. The method can further include determining that the user has provided a spoken utterance to the automated assistant in furtherance of receiving suggestions regarding one or more places in the environment to travel to. The method can further include generating location data that characterizes a respective location for each place of the one or more places in the environment. Each respective location is determined based on the contextual data and the spoken utterance from the user. The method can further include determining that a particular location, for a place that is in the environment, is located outside of a current visual scope of the computerized glasses. The current visual scope of the computerized glasses corresponds to a direction that the user is facing while wearing the computerized glasses. The method can further include causing the automated assistant to render a graphical user interface (GUI) element at a display interface of the computerized glasses. The GUI element indicates that the particular location for the place is located outside of the current visual scope of the computerized glasses.

These and other implementations disclosed herein can include one or more of the following features.

In some implementations, the GUI element indicates a direction for starting a route, from an edge of the display interface of the computerized glasses, to the particular location. In some implementations, the method can further include causing the automated assistant to render, at the display interface, other GUI elements corresponding to other places of the one or more places in the environment, where the other places are located in the current visual scope of the computerized glasses. In some implementations, the method can further include determining, based on the contextual data, that a gaze of the user is directed towards a particular place of the one or more places in the environment, where causing the other GUI elements to be rendered at the display interface includes: causing a particular GUI element of the other GUI elements to be rendered with a visual feature that is different from another visual feature of the GUI element. In some implementations, the method can further include generating, based on the location data and the spoken utterance, suggestion data that characterizes selectable suggestions, where a selection of a particular suggestion of the selectable suggestions causes the automated assistant to provide additional information regarding the particular suggestion; and causing the one or more selectable suggestions of the selectable suggestions to be rendered at the display interface of the computerized glasses with the other GUI elements. In some implementations, the method can further include determining, based on the contextual data, that a gaze of the user has changed subsequent to the one or more selectable suggestions being rendered at the display interface; and causing, based on determining that the gaze of the user has changed, one or more other selectable suggestions to be rendered at the display interface, where the one or more other selectable suggestions are associated with a particular place that the user is directing their gaze towards.

In some implementations, a method implemented by one or more processors is set forth as including operations such as processing contextual data generated at computerized glasses that are being worn by a user who is located in an environment and is directing their gaze toward a portion of the environment. The computerized glasses provide access to an automated assistant that can be invoked by the user via an interface of the computerized glasses. The method can further include generating, based on processing the contextual data, suggestion data that characterizes one or more assistant operations that can be initialized by the automated assistant when the user is located in the environment. The one or more assistant operations are associated with one or more environmental features that are visible within a current visual scope of the computerized glasses when the user is wearing the computerized glasses and directing their gaze toward the portion of the environment. The method can further include causing, based on the suggestion data and while the one or more environmental features are in the current visual scope of the computerized glasses, a set of one or more selectable suggestions to be rendered at a display interface of the computerized glasses. A user selection of a particular selectable suggestion of the set of the one or more selectable suggestions causes the automated assistant to initialize performance of a particular operation of the one or more assistant operations associated with the one or more environmental features that are visible within the current visual scope of the computerized glasses.

These and other implementations disclosed herein can include one or more of the following features.

In some implementations, processing the contextual data generated at computerized glasses includes: determining, based on the contextual data, an estimated degree of interest of the user in a type of environmental feature that is visible within the current visual scope of the computerized glasses, where the one or more environmental features correspond to the type of environmental feature when the estimated degree of interest satisfies a threshold degree of interest. In some implementations, generating the suggestion data that characterizes the one or more assistant operations includes: generating comparative data that provides information for comparing, for each environmental feature corresponding to the type of environmental feature, characteristics of the one or more environmental features. In some implementations, the type of environmental feature includes a restaurant type and the comparative data indicates a menu item for each restaurant that is visible within the current visual scope of the computerized glasses. In some implementations, the contextual data includes interaction data generated during an interaction between the user and the automated assistant, prior to the user directing their gaze toward the portion of the environment. In some implementations, the interaction data indicates that the user identified the type of environmental feature during the interaction between the user and the automated assistant. In some implementations, the contextual data includes interaction data generated during an interaction between the user and another application, prior to the user directing their gaze toward the portion of the environment.

We claim:

1. A method implemented by one or more processors, the method comprising:
processing contextual data generated at computerized glasses that are being worn by a user who is located in an environment having features that are characterized by the contextual data,
wherein the computerized glasses provide access to an automated assistant that can be invoked by the user via an interface of the computerized glasses;

determining that the user has provided a spoken utterance to the automated assistant in furtherance of receiving suggestions regarding one or more places in the environment to travel to;
generating location data that characterizes a respective location for each place of the one or more places in the environment,
  wherein each respective location is determined based on the contextual data and the spoken utterance from the user;
determining that a particular location, for a place that is in the environment, is located outside of a current visual scope of the computerized glasses,
  wherein the current visual scope of the computerized glasses corresponds to a direction that the user is facing while wearing the computerized glasses; and
causing the automated assistant to render a graphical user interface (GUI) element at a display interface of the computerized glasses,
  wherein the GUI element indicates that the particular location for the place is located outside of the current visual scope of the computerized glasses.

2. The method of claim 1, wherein the GUI element indicates a direction for starting a route, from an edge of the display interface of the computerized glasses, to the particular location.

3. The method of claim 1, further comprising:
causing the automated assistant to render, at the display interface, other GUI elements corresponding to other places of the one or more places in the environment,
  wherein the other places are located in the current visual scope of the computerized glasses.

4. The method of claim 3, further comprising:
determining, based on the contextual data, that a gaze of the user is directed towards a particular place of the one or more places in the environment,
  wherein causing the other GUI elements to be rendered at the display interface includes:
    causing a particular GUI element of the other GUI elements to be rendered with a visual feature that is different from another visual feature of the GUI element.

5. The method of claim 3, further comprising:
generating, based on the location data and the spoken utterance, suggestion data that characterizes selectable suggestions,
  wherein a selection of a particular suggestion of the selectable suggestions causes the automated assistant to provide additional information regarding the particular suggestion; and
causing the one or more selectable suggestions of the selectable suggestions to be rendered at the display interface of the computerized glasses with the other GUI elements.

6. The method of claim 5, further comprising:
determining, based on the contextual data, that a gaze of the user has changed subsequent to the one or more selectable suggestions being rendered at the display interface; and
causing, based on determining that the gaze of the user has changed, one or more other selectable suggestions to be rendered at the display interface,
  wherein the one or more other selectable suggestions are associated with a particular place that the user is directing their gaze towards.

7. A system comprising:
one or more storage devices storing instructions
one or more processors that are operable to execute the instructions to perform operations comprising:
processing contextual data generated at computerized glasses that are being worn by a user who is located in an environment having features that are characterized by the contextual data,
  wherein the computerized glasses provide access to an automated assistant that can be invoked by the user via an interface of the computerized glasses;
determining that the user has provided a spoken utterance to the automated assistant in furtherance of receiving suggestions regarding one or more places in the environment to travel to;
generating location data that characterizes a respective location for each place of the one or more places in the environment,
  wherein each respective location is determined based on the contextual data and the spoken utterance from the user;
determining that a particular location, for a place that is in the environment, is located outside of a current visual scope of the computerized glasses,
  wherein the current visual scope of the computerized glasses corresponds to a direction that the user is facing while wearing the computerized glasses; and
causing the automated assistant to render a graphical user interface (GUI) element at a display interface of the computerized glasses,
  wherein the GUI element indicates that the particular location for the place is located outside of the current visual scope of the computerized glasses.

8. The system of claim 7, wherein the GUI element indicates a direction for starting a route, from an edge of the display interface of the computerized glasses, to the particular location.

9. The system of claim 7, the operations further comprising:
causing the automated assistant to render, at the display interface, other GUI elements corresponding to other places of the one or more places in the environment,
  wherein the other places are located in the current visual scope of the computerized glasses.

10. The system of claim 9, the operations further comprising:
determining, based on the contextual data, that a gaze of the user is directed towards a particular place of the one or more places in the environment,
  wherein causing the other GUI elements to be rendered at the display interface includes:
    causing a particular GUI element of the other GUI elements to be rendered with a visual feature that is different from another visual feature of the GUI element.

11. The system of claim 9, the operations further comprising:
generating, based on the location data and the spoken utterance, suggestion data that characterizes selectable suggestions,
  wherein a selection of a particular suggestion of the selectable suggestions causes the automated assistant to provide additional information regarding the particular suggestion; and causing the one or more selectable suggestions of the selectable suggestions to be rendered at the display interface of the computerized glasses with the other GUI elements.

12. The system of claim 11, the operations further comprising:
determining, based on the contextual data, that a gaze of the user has changed subsequent to the one or more selectable suggestions being rendered at the display interface; and
causing, based on determining that the gaze of the user has changed, one or more other selectable suggestions to be rendered at the display interface,
wherein the one or more other selectable suggestions are associated with a particular place that the user is directing their gaze towards.

13. A non-transitory computer-readable medium storing instructions executable by one or more processors to cause the one or more processors to perform operations comprising:
processing contextual data generated at computerized glasses that are being worn by a user who is located in an environment having features that are characterized by the contextual data,
wherein the computerized glasses provide access to an automated assistant that can be invoked by the user via an interface of the computerized glasses;
determining that the user has provided a spoken utterance to the automated assistant in furtherance of receiving suggestions regarding one or more places in the environment to travel to;
generating location data that characterizes a respective location for each place of the one or more places in the environment,
wherein each respective location is determined based on the contextual data and the spoken utterance from the user;
determining that a particular location, for a place that is in the environment, is located outside of a current visual scope of the computerized glasses,
wherein the current visual scope of the computerized glasses corresponds to a direction that the user is facing while wearing the computerized glasses; and
causing the automated assistant to render a graphical user interface (GUI) element at a display interface of the computerized glasses,
wherein the GUI element indicates that the particular location for the place is located outside of the current visual scope of the computerized glasses.

14. The non-transitory computer-readable medium of claim 13, wherein the GUI element indicates a direction for starting a route, from an edge of the display interface of the computerized glasses, to the particular location.

15. The non-transitory computer-readable medium of claim 13, the operations further comprising:
causing the automated assistant to render, at the display interface, other GUI elements corresponding to other places of the one or more places in the environment,
wherein the other places are located in the current visual scope of the computerized glasses.

16. The non-transitory computer-readable medium of claim 15, the operations further comprising:
determining, based on the contextual data, that a gaze of the user is directed towards a particular place of the one or more places in the environment,
wherein causing the other GUI elements to be rendered at the display interface includes:
causing a particular GUI element of the other GUI elements to be rendered with a visual feature that is different from another visual feature of the GUI element.

17. The non-transitory computer-readable medium of claim 15, the operations further comprising:
generating, based on the location data and the spoken utterance, suggestion data that characterizes selectable suggestions,
wherein a selection of a particular suggestion of the selectable suggestions causes the automated assistant to provide additional information regarding the particular suggestion; and
causing the one or more selectable suggestions of the selectable suggestions to be rendered at the display interface of the computerized glasses with the other GUI elements.

18. The non-transitory computer-readable medium of claim 17, the operations further comprising:
determining, based on the contextual data, that a gaze of the user has changed subsequent to the one or more selectable suggestions being rendered at the display interface; and
causing, based on determining that the gaze of the user has changed, one or more other selectable suggestions to be rendered at the display interface,
wherein the one or more other selectable suggestions are associated with a particular place that the user is directing their gaze towards.

* * * * *